(12) United States Patent
Maher et al.

(10) Patent No.: US 7,627,744 B2
(45) Date of Patent: Dec. 1, 2009

(54) EXTERNAL MEMORY ACCESSING DMA REQUEST SCHEDULING IN IC OF PARALLEL PROCESSING ENGINES ACCORDING TO COMPLETION NOTIFICATION QUEUE OCCUPANCY LEVEL

(75) Inventors: Monier Maher, St. Louis, MO (US); Jean Pierre Bordes, St. Charles, MO (US); Christopher Lamb, St. Louis, MO (US); Sanjay J. Patel, St. Louis, MO (US)

(73) Assignee: NVIDIA Corporation, Santa Clara, CA (US)

( * ) Notice: Subject to any disclaimer, the term of this patent is extended or adjusted under 35 U.S.C. 154(b) by 224 days.

(21) Appl. No.: 11/798,119

(22) Filed: May 10, 2007

(65) Prior Publication Data
US 2008/0282058 A1 Nov. 13, 2008

(51) Int. Cl.
*G06F 13/14* (2006.01)
(52) U.S. Cl. .............................. 712/225; 710/22; 712/6
(58) Field of Classification Search ....................... None
See application file for complete search history.

(56) References Cited

U.S. PATENT DOCUMENTS

| | | | |
|---|---|---|---|
| 5,010,477 A | 4/1991 | Omoda et al. |
| 5,123,095 A | 6/1992 | Papadopoulos et al. |
| 5,577,250 A | 11/1996 | Anderson et al. |
| 5,664,162 A | 9/1997 | Dye |
| 5,721,834 A | 2/1998 | Milhaupt et al. |
| 5,765,022 A | 6/1998 | Kaiser et al. |
| 5,812,147 A | 9/1998 | Van Hook et al. |
| 5,841,444 A | 11/1998 | Mun et al. |
| 5,938,530 A | 8/1999 | Watanabe |
| 5,966,528 A | 10/1999 | Wilkinson et al. |
| 6,058,465 A | 5/2000 | Nguyen |
| 6,119,217 A | 9/2000 | Suzuoki |
| 6,223,198 B1 | 4/2001 | Oberman et al. |
| 6,317,819 B1 | 11/2001 | Morton |
| 6,317,820 B1 | 11/2001 | Shiell et al. |
| 6,324,623 B1 | 11/2001 | Carey |
| 6,341,318 B1 | 1/2002 | Dakhil |

(Continued)

FOREIGN PATENT DOCUMENTS

JP 2006-107514 4/2006

(Continued)

OTHER PUBLICATIONS

Wakamatsu, et al. "Static Modeling of Linear Object Deformation Based On Differential Geometry"; Stage Publications 2004, Journal of Robotics Research, V23, No. 3, International Mar. 2004, p. 293-311.

(Continued)

*Primary Examiner*—Kenneth S Kim
(74) *Attorney, Agent, or Firm*—Patterson & Sheridan, LLP

(57) ABSTRACT

An integrated circuit comprises an external memory, a plurality of parallel connected Vector Processing Engines (VPEs), and an External Memory Unit (EMU) providing a data transfer path between the VPEs and the external memory. Each VPE contains a plurality of data processing units and a message queuing system adapted to transfer messages between the data processing units and other components of the integrated circuit.

17 Claims, 10 Drawing Sheets

U.S. PATENT DOCUMENTS

| | | | |
|---|---|---|---|
| 6,342,892 | B1 | 1/2002 | Van Hook et al. |
| 6,366,998 | B1 | 4/2002 | Mohamed |
| 6,425,822 | B1 | 7/2002 | Hayashida et al. |
| 6,570,571 | B1 | 5/2003 | Morozumi |
| 6,779,049 | B2 | 8/2004 | Wellman et al. |
| 6,862,026 | B2 | 3/2005 | Zachmann |
| 6,966,837 | B1 | 11/2005 | Best |
| 7,120,653 | B2 | 10/2006 | Alfieri et al. |
| 7,149,875 | B2 * | 12/2006 | Kirsch ................ 712/10 |
| 7,421,303 | B2 * | 9/2008 | Zhang et al. .......... 700/45 |
| 2002/0135583 | A1 | 9/2002 | Ohba |
| 2002/0156993 | A1 | 10/2002 | Suzuoki et al. |
| 2003/0179205 | A1 | 9/2003 | Smith et al. |
| 2004/0075623 | A1 | 4/2004 | Hartman |
| 2004/0083342 | A1 | 4/2004 | Gschwind et al. |
| 2004/0193754 | A1 | 9/2004 | Kahle |
| 2005/0041031 | A1 | 2/2005 | Diard |
| 2005/0086040 | A1 | 4/2005 | Davis et al. |
| 2005/0120187 | A1 | 6/2005 | Suzuoki et al. |
| 2005/0251644 | A1 * | 11/2005 | Maher et al. ........... 712/2 |
| 2007/0079018 | A1 | 4/2007 | Day et al. |
| 2007/0279422 | A1 * | 12/2007 | Sugita et al. ......... 345/502 |

FOREIGN PATENT DOCUMENTS

| | | |
|---|---|---|
| JP | 2007-052790 | 3/2007 |

OTHER PUBLICATIONS

Zhuang, et al. "Real-Time Simulation of Physically Realistic Global Deformation", SIGGRAPH 1999.

Hauth, et al. "Corotational Simulation of Deformable Objects": Journal of WSCG, vol. 12 No. 1-3: 2003.

Patent Acts 1977: Search Report under Section 17. Sep. 3, 2008.

Office Action. U.S. Appl. No. 10/715,440. Dated Feb. 23, 2009.

Bishop, et al. "Sparta: Simulation of Physics on a Real-Time Architecture," Proceedings of the $10^{th}$ Great Lakes Symposium on VLSI, pp. 177-182, 2000.

Intel Corp. "Intel PCI and PCI Express," 1992-2004, 3 pages.

Telekinesys Research Ltd. "Havok Game Dynamics SDK," 2002, 33 pages.

Final Office Action, U.S. Appl. No. 10/715,459, dated Oct. 9, 2009.

* cited by examiner

EXTERNAL MEMORY ACCESSING DMA REQUEST SCHEDULING IN IC OF PARALLEL PROCESSING ENGINES ACCORDING TO COMPLETION NOTIFICATION QUEUE OCCUPANCY LEVEL

BACKGROUND OF THE INVENTION

1. Field of the Invention

Embodiments of the present invention relate generally to circuits and methods for performing massively parallel computations. More particularly, embodiments of the invention relate to an integrated circuit architecture and related methods adapted to generate real-time physics simulations.

2. Description of Related Art

Recent developments in computer games have created an expanding appetite for sophisticated, real-time physics simulations. Relatively simple physics-based simulations have existed in several conventional contexts for many years. However, cutting edge computer games are currently a primary commercial motivator for the development of complex, real-time, physics-based simulations.

Any visual display of objects and/or environments interacting in accordance with a defined set of physical constraints (whether such constraints are realistic or fanciful) may generally be considered a "physics-based" simulation. Animated environments and objects are typically assigned physical characteristics (e.g., mass, size, location, friction, movement attributes, etc.) and thereafter allowed to visually interact in accordance with the defined set of physical constraints. All animated objects are visually displayed by a host system using a periodically updated body of data derived from the assigned physical characteristics and the defined set of physical constraints. This body of data is generically referred to hereafter as "physics data."

Historically, computer games have incorporated some limited physics-based simulation capabilities within game applications. Such simulations are software based and implemented using specialized physics middle-ware running on a host system's Central Processing Unit (CPU), such as a Pentium®. "Host systems" include, for example, Personal Computers (PCs) and console gaming systems.

Unfortunately, the general purpose design of conventional CPUs dramatically limit the scale and performance of conventional physics simulations. Given a multiplicity of other processing demands, conventional CPUs lack the processing time required to execute the complex algorithms required to resolve the mathematical and logic operations underlying a physics simulation. That is, a physics-based simulation is generated by resolving a set of complex mathematical and logical problems arising from the physics data. Given typical volumes of physics data and the complexity and number of mathematical and logic operations involved in a "physics problem," efficient resolution is not a trivial matter.

The general lack of available CPU processing time is exacerbated by hardware limitations inherent in the general purpose circuits forming conventional CPUs. Such hardware limitations include an inadequate number of mathematical/logic execution units and data registers, a lack of parallel execution capabilities for mathematical/logic operations, and relatively limited bandwidth to external memory. Simply put, the architecture and operating capabilities of conventional CPUs are not well correlated with the computational and data transfer requirements of complex physics-based simulations. This is true despite the speed and super-scalar nature of many conventional CPUs. The multiple logic circuits and look-ahead capabilities of conventional CPUs can not overcome the disadvantages of an architecture characterized by a relatively limited number of execution units and data registers, a lack of parallelism, and inadequate memory bandwidth.

In contrast to conventional CPUs, so-called super-computers like those manufactured by Cray® are characterized by massive parallelism. Further, while programs are generally executed on conventional CPUs using Single Instruction Single Data (SISD) operations, super-computers typically include a number of vector processors executing Single Instruction-Multiple Data (SIMD) operations. However, the advantages of massively parallel execution capabilities come at enormous size and cost penalties within the context of super-computing. Practical commercial considerations largely preclude the approach taken to the physical implementation of conventional super-computers.

Thus, the problem of incorporating sophisticated, real-time, physics-based simulations within applications running on "consumer-available" host systems remains unmet. Software-based solutions to the resolution of all but the most simple physics problems have proved inadequate. As a result, a hardware-based solution to the generation and incorporation of real-time, physics-base simulations has been proposed in several related and commonly assigned U.S. patent application Ser. Nos. 10/715,459; 10/715,370; and 10/715,440 all filed Nov. 19, 2003. The subject matter of these applications is hereby incorporated by reference.

As described in the above referenced applications, the frame rate of the host system display necessarily restricts the size and complexity of the physics problems underlying the physics-based simulation in relation to the speed with which the physics problems can be resolved. Thus, given a frame rate sufficient to visually portray an simulation in real-time, the design emphasis becomes one of increasing data processing speed. Data processing speed is determined by a combination of data transfer capabilities and the speed with which the mathematical/logic operations are executed. The speed with which the mathematical/logic operations are performed may be increased by sequentially executing the operations at a faster rate, and/or by dividing the operations into subsets and thereafter executing selected subsets in parallel. Accordingly, data bandwidth considerations and execution speed requirements largely define the architecture of a system adapted to generate physics based simulations in real-time. The nature of the physics data being processed also contributes to the definition of an efficient system architecture.

Several exemplary architectural approaches to providing the high data bandwidth and high execution speed required by sophisticated, real-time physics simulations are disclosed in a related and commonly assigned U.S. patent application Ser. No. 10/839,155 filed May 6, 2004, the subject matter of which is hereby incorporated by reference. One of these approaches is illustrated by way of example in Figure (FIG.) 1 of the drawings. In particular, FIG. 1 shows a physics processing unit (PPU) 100 adapted to perform a large number of parallel computations for a physics-based simulation.

PPU 100 typically executes physics-based computations as part of a secondary application coupled to a main application running in parallel on a host system. For example, the main application may comprise an interactive game program that defines a "world state" (e.g., positions, constraints, etc.) for a collection of visual objects. The main application coordinates user input/output (I/O) for the game program and performs ongoing updates of the world state. The main application also sends data to the secondary application based on the user inputs and the secondary application performs physics-based computations to modify the world state. As the secondary application modifies the world state, it periodically and asynchronously sends the modified world state to the main application.

The various interactions between the secondary and main applications are typically implemented by reading and writing data to and from a main memory located in or near the host system, and various memories in the PPU architecture. Thus, proper memory management is an important aspect of this approach to generating physics-based simulations.

By partitioning the workload between the main and secondary applications so that the secondary application runs in parallel and asynchronously with the main application, the implementation and programming of the PPU, as well as both of the applications, is substantially simplified. For example, the partitioning allows the main application to check for updates to the world state when convenient, rather than forcing it to conform to the timing of the secondary application.

From a system level perspective, PPU 100 can be implemented in a variety of different ways. For example, it could be implemented as a co-processor chip connected to a host system such as a conventional CPU. Similarly, it could be implemented as part of one processor core in a dual core processor. Indeed, those skilled in the art will recognize a wide variety of ways to implement the functionality of PPU 100 in hardware. Moreover, those skilled in the art will also recognize that hardware/software distinctions can be relatively arbitrary, as hardware capability can often be implemented in software, and vice versa.

The PPU illustrated in FIG. 1 comprises a high-bandwidth external memory 102, a Data Movement Engine (DME) 101, a PPU Control Engine (PCE) 103, and a plurality of Vector Processing Engines (VPEs) 105. Each of VPEs 105 comprises a plurality of Vector Processing Units (VPUs) 107, each having a primary (L1) memory, and a VPU Control Unit (VCU) 106 having a secondary (L2) memory. DME 101 provides a data transfer path between external memory 102 (and/or a host system 108) and a VPEs 105. PCE 103 is adapted to centralize overall control of the PPU and/or a data communications process between PPU 100 and host system 108. PCE 103 typically comprises a programmable PPU control unit (PCU) 104 for storing and executing PCE control and communications programming. For example, PCU 104 may comprise a MIPS64 5Kf processor core from MIPS Technologies, Inc.

Each of VPUs 107 can be generically considered a "data processing unit," which is a lower level grouping of mathematical/logic execution units such as floating point processors and/or scalar processors. The primary memory L1 of each VPU 107 is generally used to store instructions and data for executing various mathematical/logic operations. The instructions and data are typically transferred to each VPU 107 under the control of a corresponding one of VCUs 106. Each VCU 106 implements one or more functional aspects of the overall memory control function of the PPU. For example, each VCU 106 may issue commands to DME 101 to fetch data from PPU memory 102 for various VPUs 107.

As described in patent application Ser. No. 10/839,155, the PPU illustrated in FIG. 1 may include any number of VPEs 105, and each VPE 105 may include any number of VPUs 107. However, the overall computational capability of PPU 100 is not limited simply by the number of VPEs and VPUs. For instance, regardless of the number of VPEs and VPUs, memory bus bandwidth and data dependencies may still limit the amount of work that each VPE can do. In addition, as the number of VPUs per VPE increases, the VCU within each VPE may become overburdened by a large number of memory access commands that it has to perform between VPUs and external memory 102 and/or PCU 104. As a result, VPUs 106 may end up idly waiting for responses from their corresponding VCU, thus wasting valuable computational resources.

In sum, while increasing the complexity of a PPU architecture may potentially increase a PPU's performance, other factors such as resource allocation and timing problems may equally impair performance in the more complex architecture.

SUMMARY OF THE INVENTION

According to one embodiment of the invention, an integrated circuit comprises an external memory, a control processor, and a plurality of parallel connected VPEs. Each one of the VPEs preferably comprises a plurality of VPUs, a plurality of VCUs, a DMA controller, and a VPE messaging unit (VMU) providing a data transfer path between the plurality of VPUs, the plurality of VCUs, the DMA controller, and the control processor. The integrated circuit further comprises an External Memory Unit (EMU) providing a data transfer path between the external memory, the control processor, and the plurality of VPEs.

According to another embodiment of the invention, a PPU comprises an external memory storing at least physics data, a PCE comprising a programmable PCU, and a plurality of parallel connected VPEs. Each one of the VPEs comprises a plurality of VPUs, each comprising a grouping of mathematical/logic units adapted to perform computations on physics data for a physics simulation, a plurality of VCUs, a DMA subsystem comprising a DMA controller, and a VMU adapted to transfer messages between the plurality of VPUs, the plurality of VCUs, the DMA subsystem, and the PCE. The PPU further comprises an EMU providing a data transfer path between the external memory, the PCE, and the plurality of VPEs.

According to still another embodiment of the invention, a method of operating an integrated circuit is provided. The integrated circuit comprises an external memory, a plurality of parallel connected VPEs each comprising a plurality of VPUs, a plurality of VCUs, and a VMU, and an EMU providing a data transfer path between the external memory and the plurality of VPEs. The method comprises transferring a communication message from a VPU in a first VPE among the plurality of VPEs to a communication message virtual queue in the VMU of the first VPE, and transferring the communication message from the communication message virtual queue to a destination communication messages receive first-in-first-out queue (FIFO) located in a VPU or VCU of the first VPE.

BRIEF DESCRIPTION OF THE DRAWINGS

The invention is described below in relation to several embodiments illustrated in the accompanying drawings. Throughout the drawings like reference numbers indicate like exemplary elements, components, or steps. In the drawings.

DESCRIPTION OF EXEMPLARY EMBODIMENTS

Exemplary embodiments of the invention are described below with reference to the corresponding drawings. These embodiments are presented as teaching examples. The actual scope of the invention is defined by the claims that follow.

In general, embodiments of the invention are designed to address problems arising in the context of parallel computing. For example, several embodiments of the invention provide mechanisms for managing large numbers of concurrent memory transactions between a collection of data processing units operating in parallel and an external memory. Still other embodiments of the invention provide efficient means of communication between the data processing units.

Embodiments of the invention recognize a need to balance various design, implementation, performance, and programming tradeoffs in a highly specialized hardware platform. For example, as the number of parallel connected components, e.g., vector processing units, in the platform increases, the degree of networking required to coordinate the operation of the components and data transfers between the components also increases. This networking requirement adds to programming complexity. Further, the use of Very Long Instruction Words (VLIWs), multi-threading data transfers, and multiple thread execution can also increase programming complexity. Moreover, as the number of components increases, the added components may cause resource (e.g., bus) contention. Even if the additional components increase overall throughput of the hardware platform, they may decrease response time (e.g., memory latency) for individual components. Accordingly, embodiments of the invention are adapted to strike a balance between these various tradeoffs.

The invention is described below in the context of a specialized hardware platform adapted to perform mathematical/logic operations for a real-time physics simulation. However, the inventive concepts described find ready application in a variety of other contexts. For example, various data transfer, scheduling, and communication mechanisms described find ready application in other parallel computing contexts such as graphics processing and image processing, to name but a couple.

Figure 1:
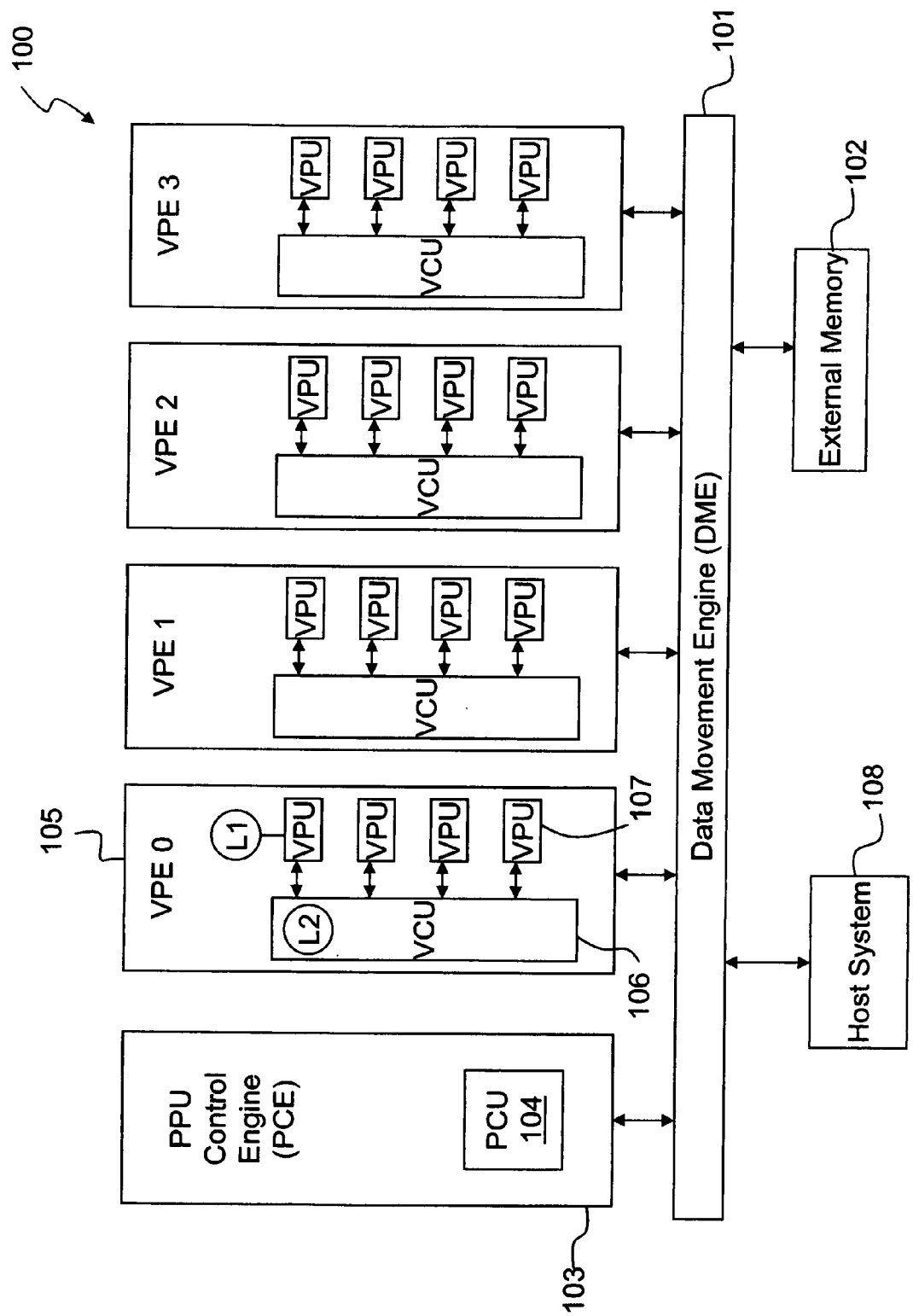
FIG. 1 is a block diagram illustrating a conventional Physics Processing Unit (PPU)
Figure 2:
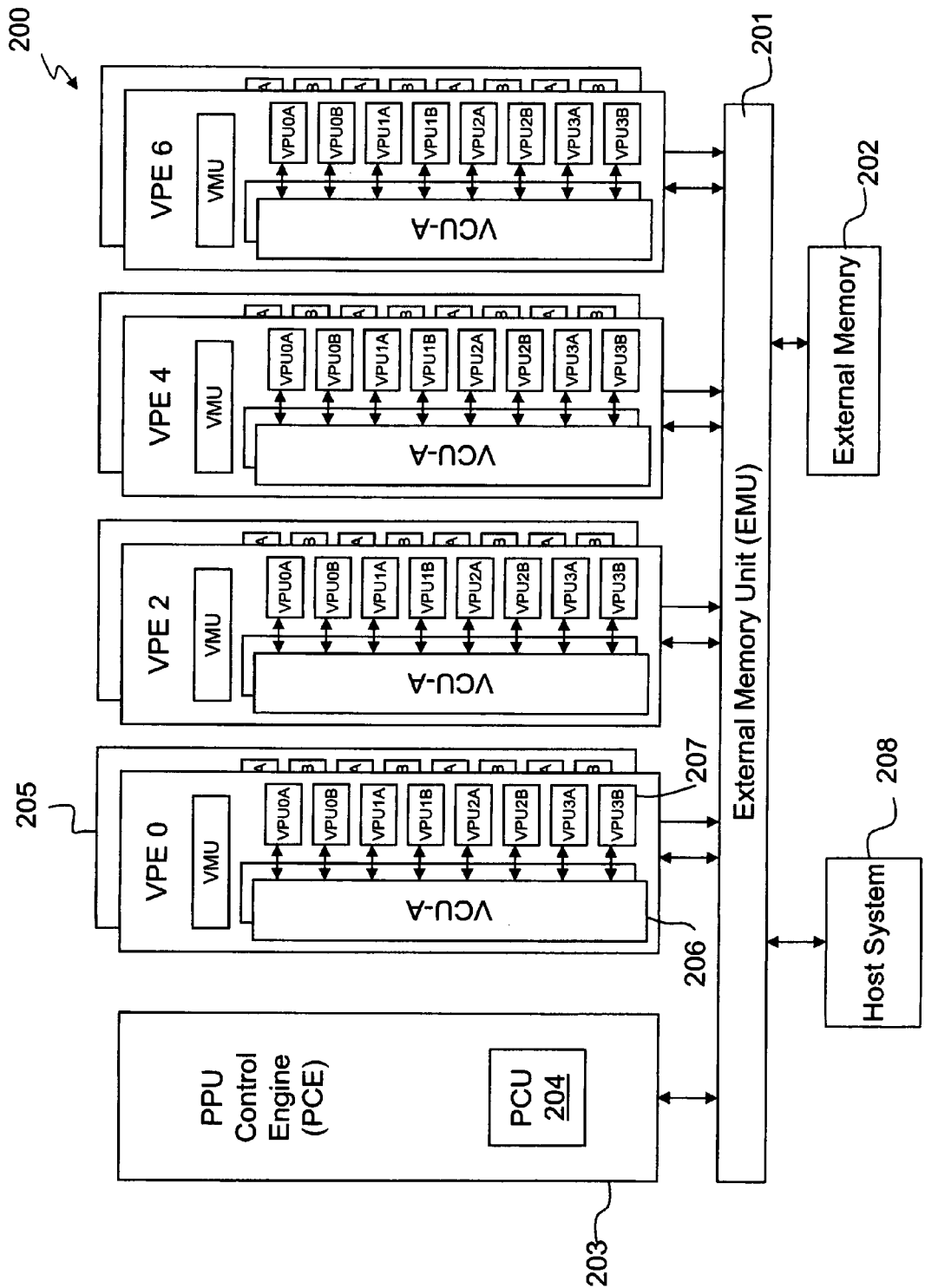
FIG. 2 is a block diagram illustrating a PPU in accordance with one embodiment of the present invention.

FIG. 2 is a block level diagram of a PPU 200 adapted to run a physics-based simulation in accordance with one exemplary embodiment of the invention. PPU 200 comprises an External Memory Unit (EMU) 201, a PCE 203, and a plurality of VPEs 205. Each of VPEs 205 comprises a plurality of VCUs 206, a plurality of VPUs 207, and a VPE Messaging Unit (VMU) 209. PCE 203 comprises a PCU 204. For illustration purposes, PPU 200 includes eight (8) VPEs 205, each containing two (2) VCUs 206, and eight (8) VPUs 207.

EMU 201 is connected between PCE 203, VPEs 205, a host system 208, and an external memory 202. EMU 201 typically comprises a switch adapted to facilitate data transfers between the various components connected thereto. For example, EMU 201 allows data transfers from one VPE to another VPE, between PCE 203 and VPEs 205, and between external memory 202 and VPEs 205.

EMU 201 can be implemented in a variety of ways. For example, in some embodiments, EMU 201 comprises a crossbar switch. In other embodiments, EMU 201 comprises a multiplexer. In still other embodiments, EMU 201 comprises a crossbar switch implemented by a plurality of multiplexers. Any data transferred to a VPE through an EMU is referred to as EMU data in this written description. In addition, any external memory connected to a PPU through an EMU is referred to as an EMU memory in this written description.

The term Direct Memory Access (DMA) operation or DMA transaction denotes any data access operation that involves a VPE but not PCE 203 or a processor in host system 208. For example, a read or write operation between external memory 202 and a VPE, or between two VPEs is referred to as a DMA operation. DMA operations are typically initiated by VCUs 206, VPUs 207, or host system 208. To initiate a DMA operation, an initiator (e.g., a VCU or VPU) generally sends a DMA command to a DMA controller (not shown) via a sequence of queues. The DMA controller then communicates with various memories in VPEs 205 and external memory 202 or host system 208 based on the DMA command to control data transfers between the various memories. Each of VPEs 205 typically includes its own DMA controller, and memory transfers generally occur within a VPE or through EMU 201.

Each of VPEs 205 includes a VPE Message Unit (VMU) adapted to facilitate DMA transfers to and from VCUs 206 and VPUs 207. Each VMU typically comprises a plurality of DMA request queues used to store DMA commands, and a scheduler adapted to receive the DMA commands from the DMA request queues and send the DMA commands to various memories in VPEs 205 and/or external memory 202. Each VMU typically further comprises a plurality of communication message queues used to send communication messages between VCUs 206 and VPUs 207.

Each of VPEs 205 establishes an independent "computational lane" in PPU 200. In other words, independent parallel computations and data transfers can be carried out via each of VPEs 205. PPU 200 has a total of eight (8) computational lanes.

Figure 3:
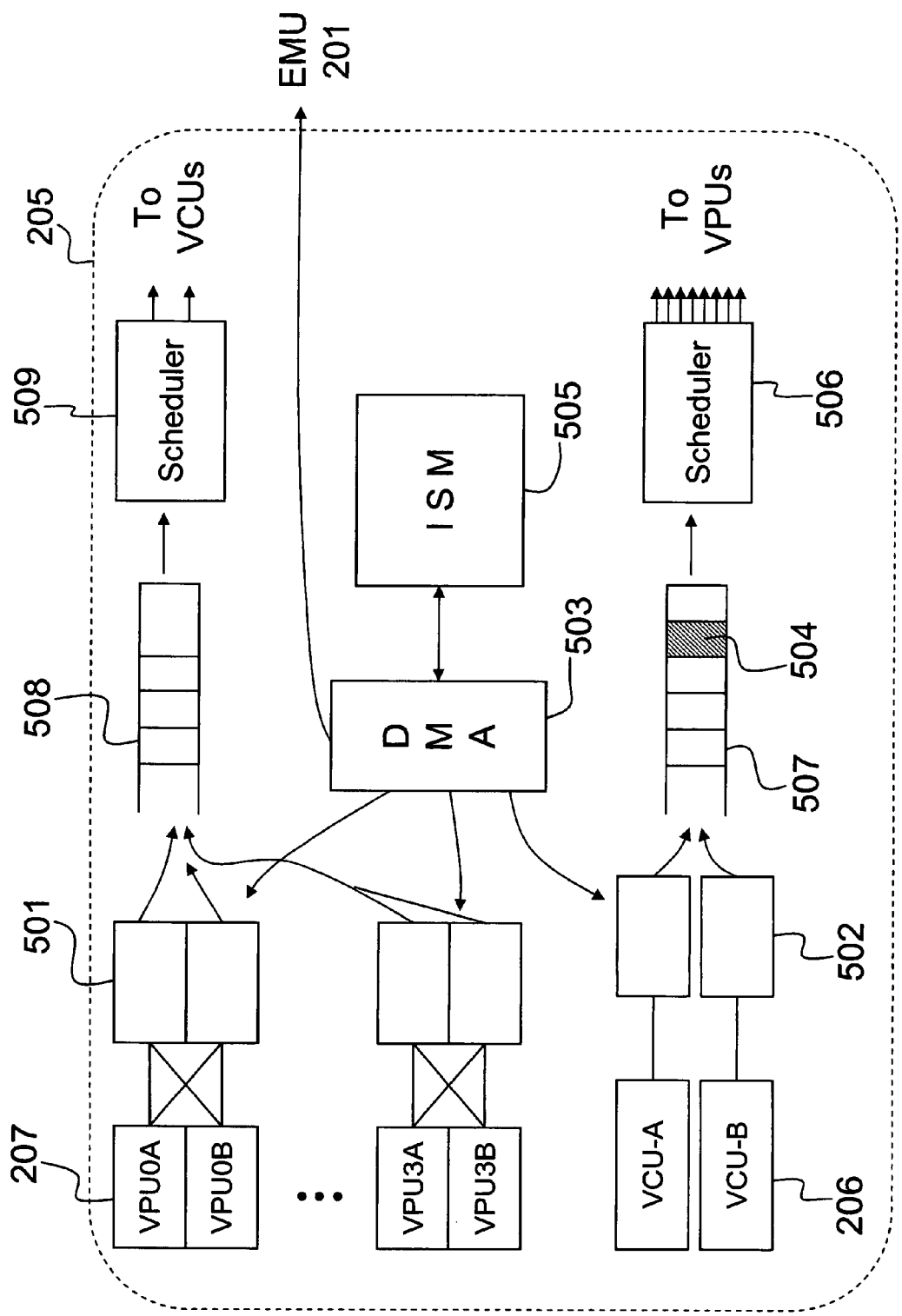
FIG. 3 is a block diagram of a VPE in accordance with an embodiment of the present invention.

Memory requests and other data transfers going through VPEs 205 are generally managed through a series of queues and other hardware associated with each VPE. For example, FIG. 3 is a block diagram showing an exemplary VPE 205 including a plurality of queues and associated hardware for managing memory requests and other data transfers. Collectively, the queues and associated hardware can be viewed as one embodiment of a VMU such as those shown in FIG. 2.

In the embodiment shown in FIG. 3, VPE 205 comprises VPUs 207 and VCUs 206. Each VPU 207 comprises an instruction memory and a data memory, represented collectively as local memories 501. Preferably, VPUs 207 are organized in pairs that share the same instruction memory. Each of VCUs 207 also comprises a data memory and an instruction memory, collectively represented as local memories 502.

VPE 205 further comprises a DMA controller 503 adapted to facilitate data transfers between any of the memories in VPE 205 and external memories such as external memory 202. VPE 205 further comprises an Intermediate Storage Memory (ISM) 505, which is adapted to store relatively large amounts of data compared with local memories 501 and 502. In terms of its structure and function, ISM 505 can be thought of as a "level 2" memory, and local memories 501 and 502 can be thought of as "level 1" memories in a traditional memory hierarchy. DMA controller 201 generally fetches chunks of EMU data through EMU 201 and stores the EMU data in ISM 505. The EMU data in ISM 505 is then transferred to VPUs 207 and/or VCUs 206 to perform various computations, and any EMU data modified by VPUs 207 or VCUs 206 are generally copied back to ISM 505 before the EMU data is transferred back to a memory such as external memory 202 through EMU 201.

VPE 205 still further comprises a VPU message queue 508, a VPU scheduler 509, a VCU message queue 507, and a VCU scheduler 506. VPU message queue 508 transfers messages from VPUs 207 to VCUs 206 through scheduler 509. Similarly, VCU message queue 507 transfers messages from VCUs 206 to VPUs 207 via scheduler 506. The term "message" here simply refers to a unit of data, preferably 128 bytes. A message can comprise, for example, instructions, pointers, addresses, or operands or results for some computation.

Figure 4:
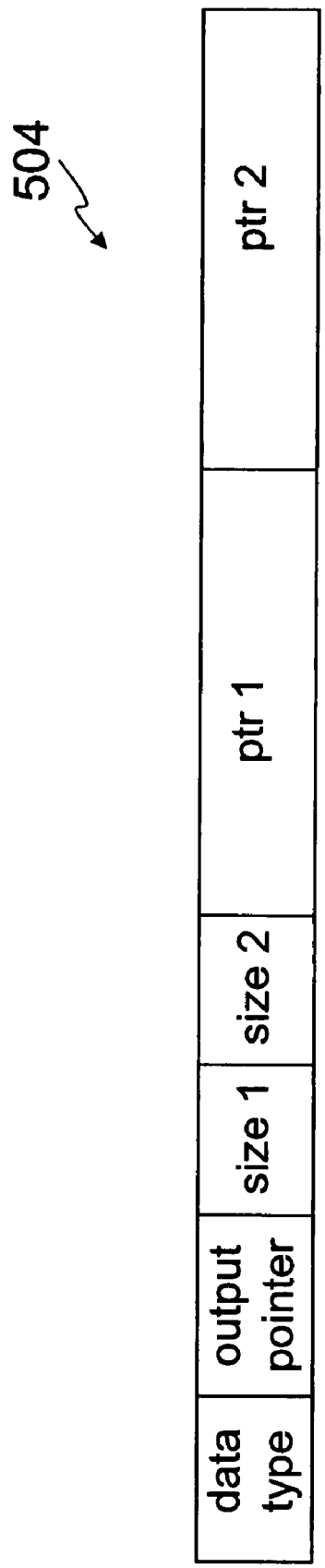
FIG. 4 is an illustration of a message in the VPE shown in FIG. 3.

FIG. 4 shows a simple example of a message that could be sent to a VPU from a VCU. Referring to FIG. 4, a message in VCU message queue 507 of FIG. 3 includes a data type, a pointer to an output address in local memories 501, respective sizes for first and second input data, and pointers to the first and second input data in ISM 505. When the VPU receives the message, the VPU can use the message data to create a DMA command for transferring the first and second input data from ISM 505 to the output address in local memories 501.

Although the VPE 205 shown in FIG. 3 includes one queue and scheduler for VPUs 207 and one queue and scheduler for VCUs 206, the number and arrangement of the queues and schedulers can vary. For example, each VPU 207 or VCU 206 may have its own queue and scheduler, or even many queues and schedulers. Moreover, messages from more than one queue may be input to each scheduler.

Figure 5:
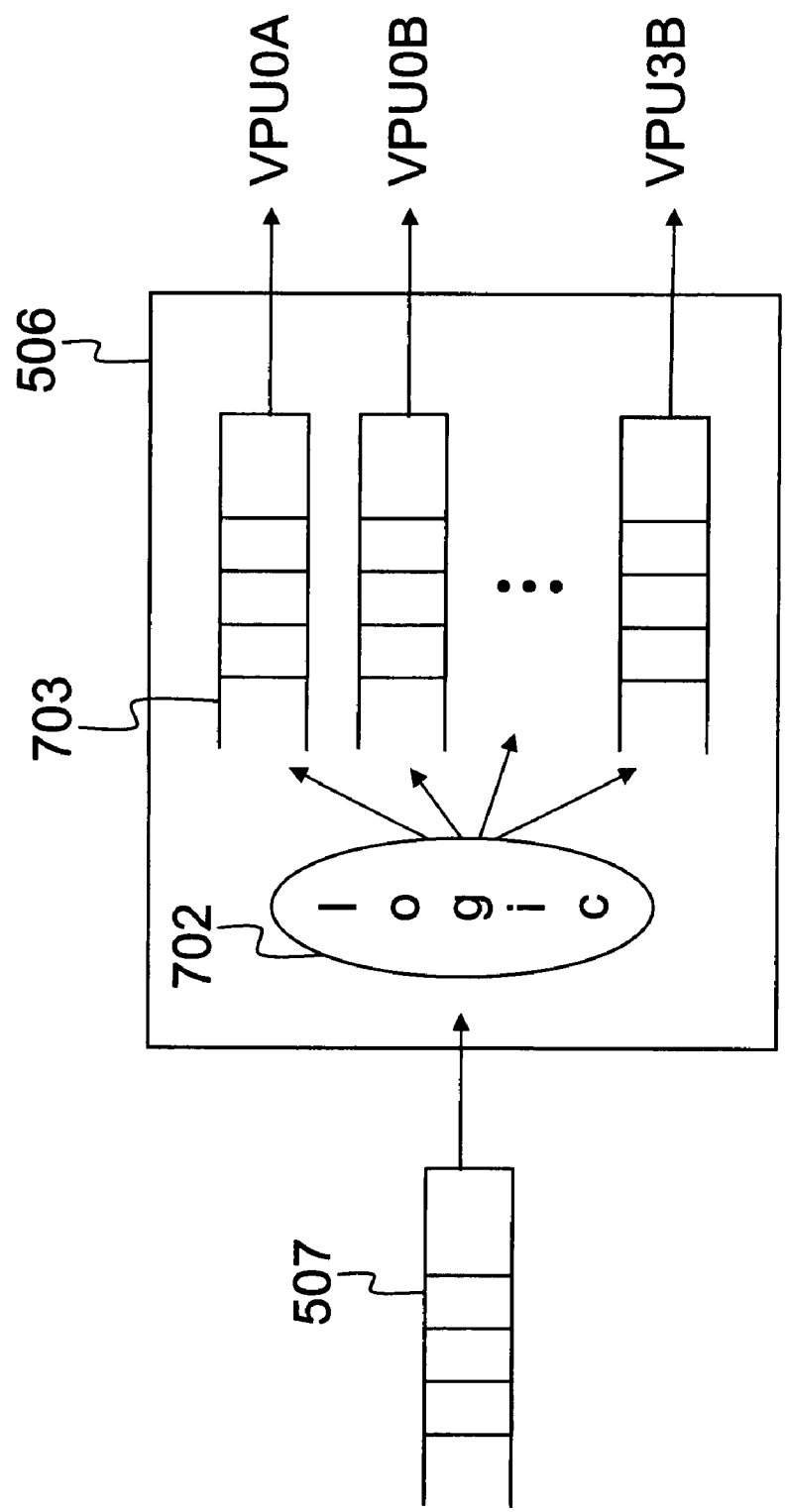
FIG. 5 is a block diagram of a scheduler for a message queuing system in the VPE shown in FIG. 3.

FIG. 5 shows an exemplary embodiment of scheduler 506 shown in FIG. 3. The embodiment shown in FIG. 5 is preferably implemented in hardware to accelerate the forwarding of messages from VCUs to VPUs. However, it could also be implemented in software.

Referring to FIG. 5, scheduler 506 comprises a logic circuit 702 and a plurality of queues 703 corresponding to VPUs 207. Scheduler 506 receives messages from VCU message queue 507 and inserts the messages into queues 703 based on logic implemented in logic circuit 702. The messages in queues 703 are then sent to VPUs 207.

Figure 6:
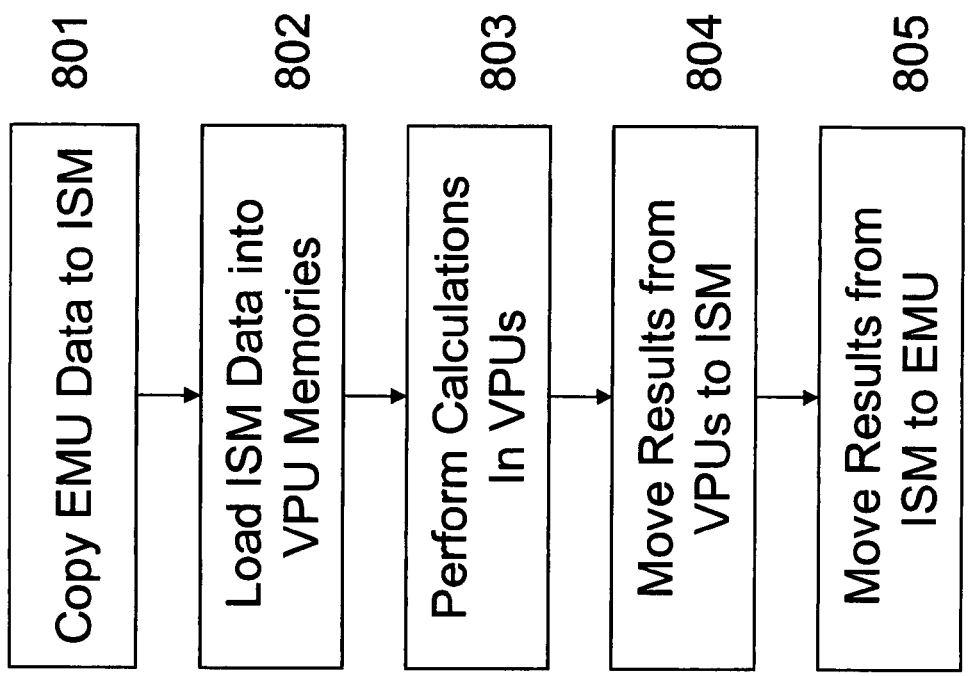
FIG. 6 is a flowchart illustrating a typical sequence of operations performed by the VPE 205 shown in FIG. 3 when performing a calculation on data received through an external memory unit.

FIG. 6 is a flowchart illustrating a typical sequence of operations performed by the VPE 205 shown in FIG. 3 when performing a calculation on EMU data received through EMU 201. Exemplary method steps shown in FIG. 6 are denoted below by parentheses (XXX) to distinguish them from exemplary system elements such as those shown in FIGS. 1 through 5.

Referring to FIG. 6, one of VCUs 206 sends an EMU data request command to DMA controller 503 so that DMA controller 503 will copy EMU data to ISM 505 (801). The VCU 206 then inserts a work message into its message queue 507. The message is delivered by the scheduler to an in-bound queue of a VPU 207. Upon receipt of the message, the VPU is instructed to send a command to DMA controller 503 to load the EMU data from ISM 505 into local memory 501 (802). Next, the VPUs 207 perform calculations using the data loaded from ISM 205 (803). Then, the VCU 206 sends a command to DMA 503 to move results of the calculations from the local memory 501 back to ISM 505 (804). When all work messages have been processed, VCU 206 sends a command to DMA controller 503 to move the results of the calculations from ISM 205 to EMU 201 (805).

Figure 7A:
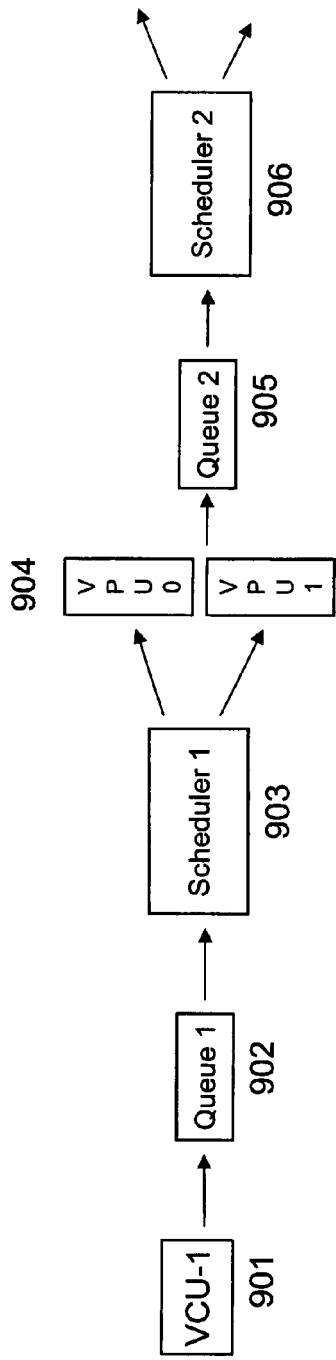
FIG. 7 shows various alternative scheduler and queue configurations that could be used in the VPE shown in FIG. 3.
Figure 7B:
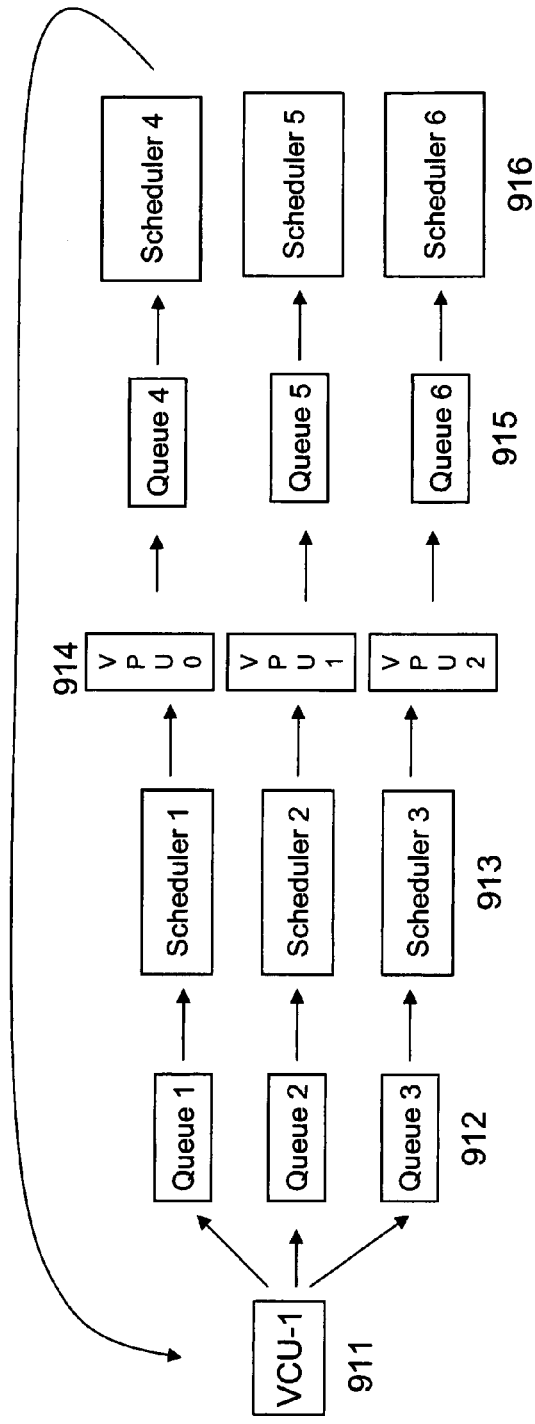

FIG. 7 shows alternative scheduler and queue configurations that could be used in the VPE 205 shown in FIG. 3. In particular, FIG. 7A shows a configuration where there is a one to one correspondence between a VCU 901 and a queue and scheduler 902 and 903. Scheduler 903 sends messages from queue 902 to two VPUs 904, and in turn, VPUs 904 send messages to other VPUs and VCUs through a queue and scheduler 905 and 906. FIG. 7B shows a configuration where there is a one to many correspondence between a VCU 911 and a plurality of queues and schedulers 912 and 913. In FIG. 7B, each scheduler 913 sends messages to one of a plurality of VPUs 914, and each of VPUs 914 sends messages back to VCU 911 through respective queues and schedulers 915 and 916.

The queues and schedulers shown in FIG. 7 are generally used for communication and data transfer purposes. However, these and other queues and schedulers could be used for other purposes such as storing and retrieving debugging messages.

Figure 8:
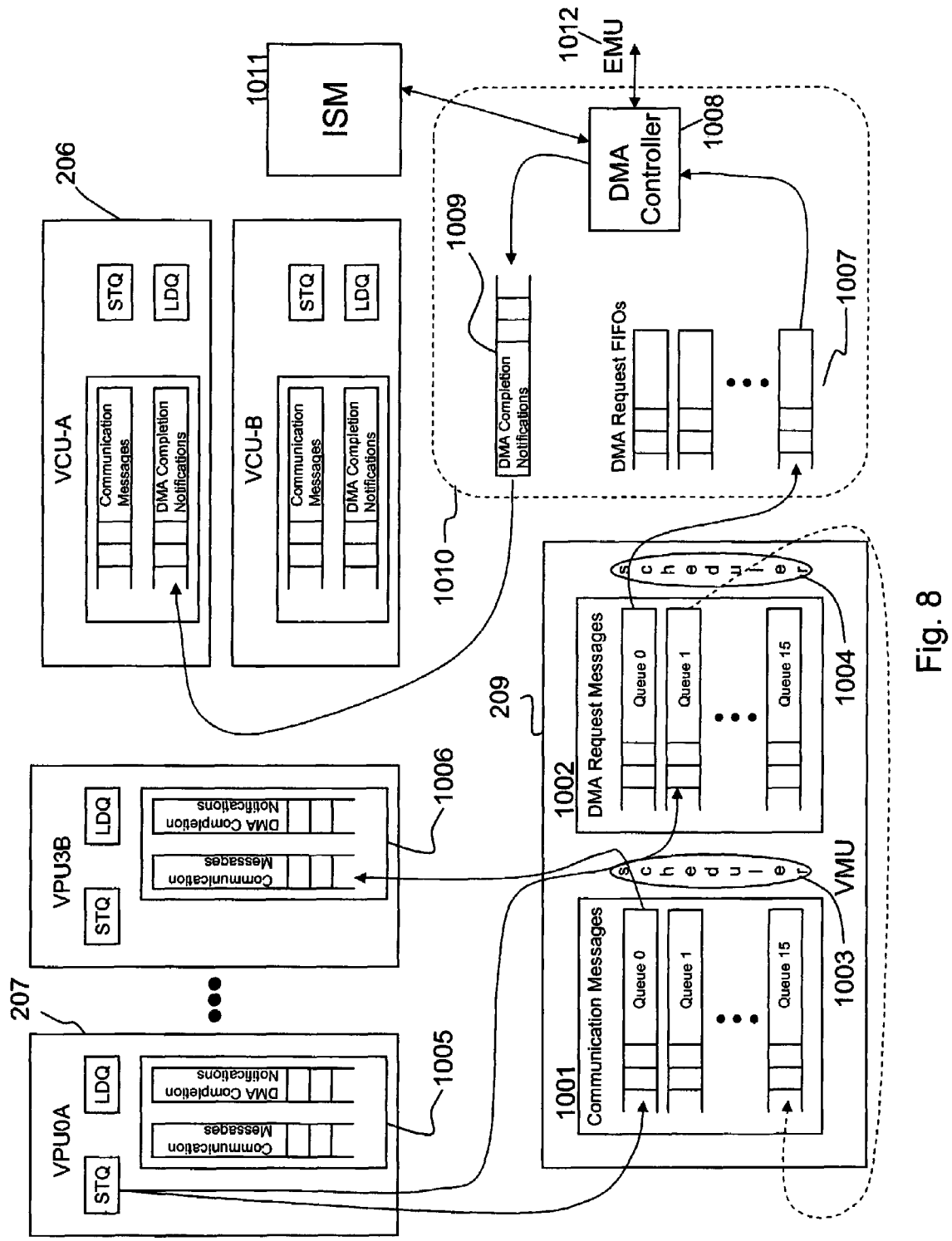
FIG. 8 is a block diagram of a VPE according to yet an embodiment of the present invention.

FIG. 8 shows a VPE according to yet an embodiment of the present invention. The VPU shown in FIG. 8 is intended to illustrate a way of implementing a message queue system in the VPE, and therefore various processing elements such as those used to perform computations in VPUs are omitted for simplicity of illustration.

The VPE of FIG. 8 is adapted to pass messages of two types between its various components. These two types of messages are referred to as "communication messages" and "DMA request messages." A communication message comprises a unit of user defined data that gets passed between two VPUs or between a VPU and a VCU in the VPE. A communication message may include, for example, instructions, data requests, pointers, or any type of data. A DMA request message, on the other hand, comprises a unit of data used by a VPU or VCU to request that a DMA transaction be performed by a DMA controller in the VPE. For illustration purposes, it will be assumed that each communication and DMA request message described in relation to FIG. 8 comprises 128 bits of data.

The VPE of FIG. 8 comprises a plurality of VPUs 207, a plurality of VCUs 206, a VMU 209, and a DMA subsystem 1010. Messages are passed between VCUs 206, VPUs 207, and DMA subsystem 1010 through VMU 209.

VMU 209 comprises a first memory 1001 for queuing communication messages and a second memory 1002 for queuing DMA request messages. The first and second memories are both 256×128 bit memories, each with one read port and one write port. Each of the first and second memories is subdivided into 16 virtual queues. The virtual queues in first memory 1001 are referred to as communication message virtual queues, and the virtual queues in second memory 1002 are referred to as DMA request virtual queues.

Configuration and usage of the virtual queues is user defined. However, VMU 209 preferably guarantees that each virtual queue acts independently from every other virtual queue. Two virtual queues act independent from each other if the usage or contents of either virtual queue never causes the other virtual queue to stop making forward progress.

Each virtual queue in first and second memories 1001 and 1002 is configured with a capacity and a start address. The capacity and start address are typically specified in units of 128 bits, i.e., the size of one message. For example, a virtual queue with a capacity of two (2) can store two messages, or 256 bits. Where the capacity of a virtual queue is set to zero, then the queue is considered to be inactive. However, all active queues generally have a capacity between 2 and 256.

Each virtual queue is also configured with a "high-water" occupancy threshold that can range between one (1) and the capacity of the virtual queue minus one. Where the amount of data stored in a virtual queue exceeds the high-water occupancy threshold, the virtual queue may generate a signal to indicate a change in the virtual queue's behavior. For example, the virtual queue may send an interrupt to PCE 203 to indicate that it will no longer accept data until its occupancy falls below the high-water occupancy threshold.

Each virtual queue can also be configured to operate in a "normal mode" or a "ring buffer mode." In the ring buffer mode, the high-water occupancy threshold is ignored, and new data can always be enqueued in the virtual queue, even if the new data overwrites old data stored in the virtual queue. Where old data in a virtual queue is overwritten by new data, a read pointer and a write pointer in the virtual queue are typically moved so that the read pointer points to the oldest data in the virtual queue and the write pointer points to a next address where data will be written.

Each communication message virtual queue is configured with a set of destinations. For example, in the VPE shown in FIG. 8, possible destinations include eight (8) VPUs 207, two (2) VCUs 205, and PCE 203, for a total of eleven (11) destinations. The eleven destinations are generally encoded as an eleven (11) bit bitstring so that each virtual queue can be configured to send messages to any subset of the eleven destinations.

One way to configure the various properties of the virtual queues is by storing configuration information for each of the virtual queues in memory mapped configuration registers. The memory mapped configuration registers are typically mapped onto a memory address space of PCE 203 and a memory address space of VCUs 206. VCUs 206 can access the configuration information stored therein, but the virtual queues are preferably only configured by PCE 203.

VPUs 207 and VCUs 206 each comprise two (2) first-in-first-out queues (FIFOs) for receiving messages from VMU 209. Collectively, the two FIFOs are referred to as "receive FIFOs," and they include a communication messages receive FIFO and a DMA completion notifications receive FIFO. Each communication message receive FIFO preferably comprises an 8 entry by 128-bit queue and each DMA completion notifications receive FIFO preferably comprises a 32 entry by 32 bit queue.

VPEs 207 and VCUs 206 both use a store instruction STQ to send messages to VMU 209, and a load instruction LDQ to read messages from their respective receive FIFOs.

As explained previously with reference to FIG. 3, pairs of VPUs 207 can share a single physical memory. Accordingly, the receive FIFOs for each pair of VPUs 207 can be implemented in the same physical memory. Where the receive FIFOs for a pair of VPUs 207 are implemented in the same physical memory, there may be memory contention between the VPUs 207 both trying to send load and store instructions to the memory. A simple way to address this type of memory contention is to give one of the pair of VPUs strict priority of the other VPU in the pair.

Like the virtual queues in VMU 209, the receive FIFOs in each VPU act independent of each other. In other words, the usage or contents of one receive FIFO will not stop the forward progress of another receive FIFO.

Also like the virtual queues in VMU 209, the communication message receive FIFOs have a configurable high-water occupancy threshold. When the occupancy of a communication message receive FIFO reaches the high-water occupancy threshold the communication message receive FIFO generates a backpressure indication to prevent more messages from being sent to the FIFO. The high-water occupancy threshold for a communication message receive FIFO is typically between 1 and 5, with a default of 5.

Where all communication message receive FIFOs configured as destinations for a particular communication message virtual queue reach their respective high-water occupancy thresholds, the communication message virtual queue is blocked from sending any communication messages to those destinations. As a result, the communication message virtual queue may fill up, causing subsequent attempts to enqueue data to the virtual queue to fail.

All communication messages within the communication message virtual queues are eligible to be transferred, in FIFO order, to corresponding communication message receive FIFOs. However, VMU 209 can only transfer one communication message to a receive FIFO per clock cycle. Accordingly, a scheduler 1003 is included in VMU 209 to provide fairness between the communication message virtual queues.

Scheduler 1003 typically schedules data transfers between communication message virtual queues and communication message receive FIFOs using a round robin scheduling technique. According to this technique, the scheduler examines each communication message virtual queue in round robin order. Where an examined virtual queue is not empty, and a next communication message in the virtual queue has a destination communication message receive FIFO that is not above its high-water occupancy threshold, the scheduler sends the communication message to the destination communication message receive FIFO. To facilitate efficient examination of the communication message virtual queues, scheduler 1003 maintains an indication of the destination communication message receive FIFO for the next message in each communication message virtual queue. This allows scheduler 1003 to efficiently check whether the destination communication message receive FIFOs are above their respective high-water occupancy thresholds.

Where all of the communication message virtual queues are empty or all of their corresponding destination communication message receive FIFOs are above their respective high-water occupancy thresholds, no data is transferred between the communication message virtual queues and the communication message receive FIFOs. Otherwise, a communication message selected by scheduler 1003 is moved from the head of one of the communication message virtual queues to the tail of one of the communication message receive FIFOs.

The DMA request message virtual queues in second memory 1002 receive DMA request messages from VPUs 207 and VCUs 206. Each DMA request message typically comprises 128 bits of information, together with an optional 32-bit DMA completion notification. The DMA request messages are transferred through the DMA request message virtual queues to a set of DMA request FIFOs 1007. The order in which messages are transferred from the DMA request message virtual queues is determined by a scheduler 1004.

DMA request messages in DMA request FIFOs 1007 are transferred to a DMA controller 1008, which performs DMA transactions based on the DMA request messages. A typical DMA transaction comprises, for example, moving data to and/or from various memories associated with VPUs 207 and/or VCUs 206. Upon completion of a DMA transaction, any DMA completion notification associated with a DMA request message that initiated the DMA transaction is transferred from DMA controller 1008 to a DMA completion notifications FIFO 1009. The DMA completion notification is then transferred to a DMA completion notification receive FIFO in one of VPUs 207 or VCUs 206.

In addition to DMA request messages, the DMA request message virtual queues may also include extended completion notification (ECN) messages. An ECN message is a 128-bit message inserted in a DMA request message virtual queue immediately after a DMA request message. The ECN message is typically used instead of a 32-bit completion notification. The ECN message is sent to a communication message receive FIFO through one of the communication message virtual queues to indicate that the DMA request message has been sent to DMA controller 1008. An exemplary ECN message is shown in FIG. 8 by a dotted arrow.

The ECN message can be sent to the communication message virtual queue either upon sending the DMA request message to DMA controller 1008, or upon completion of a DMA transaction initiated by the DMA request message, depending on the value of a "fence" indication in the DMA request message. If the fence indication is set to a first value, the ECN message is sent to the communication message virtual queue upon sending the DMA request message to DMA controller 1008. Otherwise, the ECN message is sent to the communication message virtual queue upon completion of the DMA transaction.

Scheduler 1004 preferably uses a round robin scheduling algorithm to determine the order in which DMA request messages are transferred from DMA request message virtual queues to DMA request FIFOs 1007. Under the round robin scheduling algorithm, scheduler 1004 reads a next DMA request message from a non-empty DMA request message virtual queue during a current clock cycle. The next DMA request message is selected by cycling through the non-empty DMA request message virtual queues in successive clock cycles in round robin order.

The next DMA request message is transferred to DMA request FIFO during the current clock cycle unless one or more of the following conditions are met: DMA request FIFOs 1007 are all fill; the next DMA request message has a DMA completion notification destined for a DMA completion notification receive FIFO that is full, or above its high-water occupancy threshold; or, the DMA request message has an associated ECN message, and the ECN message's destination communication message FIFO is full.

To provide true independence between virtual queues, VMU 209 must prevent DMA completion notifications FIFO 1009 from blocking the progress of DMA controller 1008. DMA completion notifications FIFO 1009 may block DMA controller 1008, for example, if VCUs 206 or VPUs 207 are slow to drain their respective DMA completion notification receive FIFOs, causing DMA completion notifications to fill up. One way that VMU 209 can prevent DMA completion notifications FIFO 1009 from blocking the progress of DMA controller 1009 is by preventing any DMA request message containing a 32-bit DMA completion notification from being dequeued from its DMA request virtual queue unless a DMA completion notifications receive FIFO for which the DMA completion notification is destined is below its high-water occupancy threshold.

DMA controller 1008 can perform various different types of DMA transactions in response to different DMA request messages. For example, some DMA transactions move data from the instruction memory of one VPU to the instruction memory of another VPU. Other transactions broadcast data from an ISM 1011 to a specified address in the data memories of several or all of VPUs 207, e.g., VPUs labeled with the suffix "A" in FIGS. 2 and 8. Still other DMA transactions broadcast data from ISM 1011 to the instruction memories of several or all of VPUs 207.

Another type of DMA transaction that can be initiated by a DMA request message is an Atomic EMU DMA transaction. In Atomic EMU DMA transactions, DMA controller 1008 moves data between ISM 1011 and an EMU memory 1012 using "load-locked" and "store-conditional" semantics. More specifically, load-locked semantics can be used when transferring data from EMU memory 1012 to ISM 1011, and store-conditional semantics are used when transferring data from ISM 1011 to EMU memory 1012.

Load-locked semantics and store-conditional semantics both rely on a mechanism whereby an address in EMU memory 1012 is "locked" by associating the address with an identifier of a particular virtual queue within one of VPEs 205. The virtual queue whose identifier is associated with the address is said to have a "lock" on the address. Also, when a virtual queue has a lock on an address, the address is said to be "locked." If another identifier becomes associated with the address, the virtual queue is said to "lose," or "release" the lock.

A virtual queue typically gets a lock on an address in EMU memory 1012 when a DMA request message from the virtual queue instructs DMA controller 1008 to perform a read operation from EMU memory 1012 to ISM 1011. A read operation that involves getting a lock on an address is termed a "load-locked" operation. Once the virtual queue has the lock, an EMU controller (not shown) in EMU memory 1012 may start a timer. The timer is typically configured to have a limited duration. If the duration is set to zero, then the timer will not be used. While the timer is running, any subsequent read operation to the address in EMU memory 1012 will not unlock or lock any addresses. The use of the timer reduces a probability that an address locked by a DMA transaction from one VPE will be accessed by a DMA transaction from another VPE.

While the timer is not running, subsequent read operations to the address will release the old lock and create a new lock. In other words, another virtual queue identifier will become associated with the address.

A "store-conditional" operation is a write operation from EMU memory 1012 to ISM 1011 that only succeeds if it originates from a virtual queue that has a lock on a destination address of the write operation.

As with other DMA transactions, Atomic EMU DMA transactions can be initiated by DMA request messages having 32-bit DMA completion notifications. However, if a store-conditional operation does not succeed, a bit in the corresponding DMA completion notification is set to a predetermined value to indicate the failure to one of VPUs 207 or VCUs 206.

Figure 9:
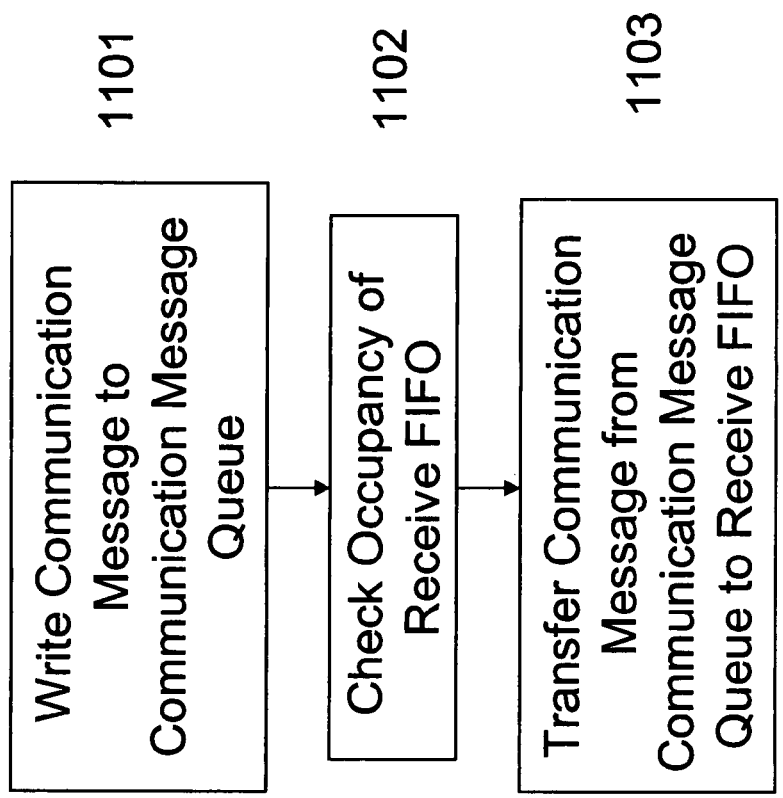
FIG. 9 is a flowchart illustrating a method of transferring a communication message between a VPU or VCU in the VPE shown in FIG. 8 according to an embodiment of the present invention; and, FIG. 10 is a flowchart illustrating a method of performing a DMA operation in a VPE based on a DMA request message according to an embodiment of the present invention.
Figure 10:
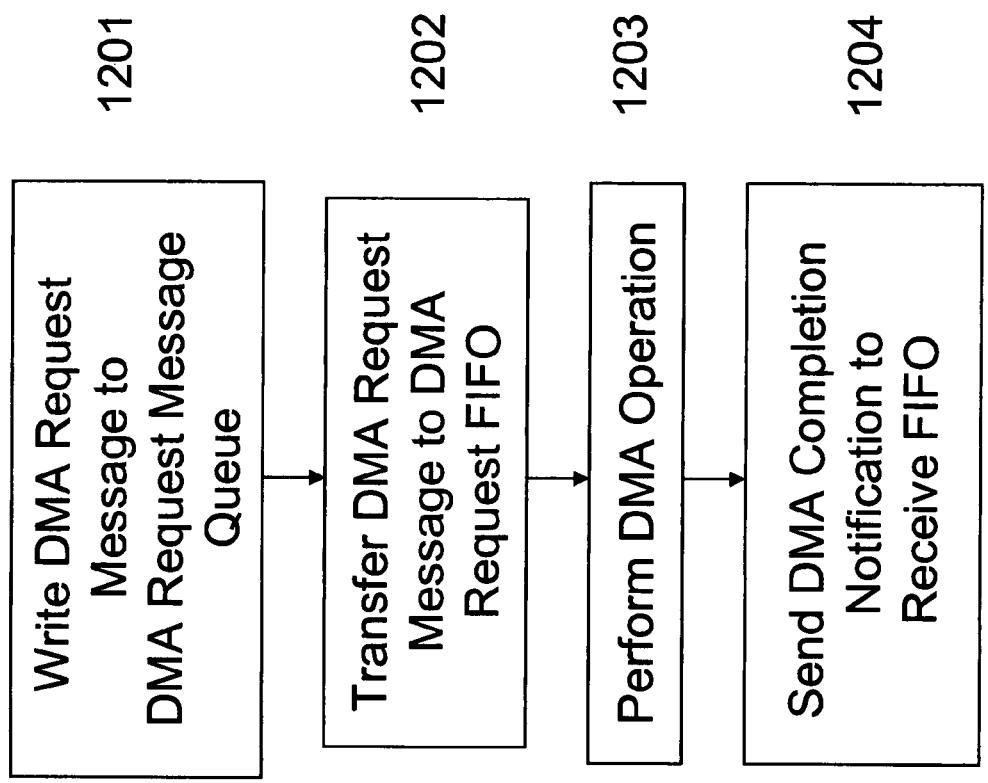

FIGS. 9 and 10 are flowcharts illustrating methods of sending messages in a circuit such as the VPE shown in FIG. 8. In particular, FIG. 9 illustrates a method of transferring a communication message from a VPU or VCU to another VPU or VCU in a VPE according to one embodiment of the invention, and FIG. 10 illustrates a method of performing a DMA operation in a VPE based on a DMA request message according to an embodiment of the present invention.

Referring to FIG. 9, the method of transferring a communication message from a VPU or VCU to another VPU or VCU in a VPE comprises the following. First, in a step 1101, a VPU or VCU writes a communication message to one of a plurality of communication message queues. Next, in a step 1102, a scheduler checks the occupancy of a destination receive FIFO for the communication message. Finally, in a step 1103, if the occupancy of the destination receive FIFO is below a predetermined high-water occupancy threshold, the communication message is transferred to the destination receive FIFO.

Referring to FIG. 10, the method of performing the DMA operation in a VPE comprises the following. First, in a step 1201, a VPU or VCU writes a DMA request message to one of a plurality of DMA request message queues. Next, in a step 1202, the DMA request message is transferred from the DMA request message queue to a DMA request FIFO. Then, in a step 1203, the DMA request message is transferred to a DMA controller and the DMA controller performs a DMA operation based on the DMA request message. Finally, in a step 1204, a DMA completion notification associated with the DMA request message is sent to a DMA completion notification receive FIFO in one or more VPUs and/or VCUs within the VPE.

The foregoing preferred embodiments are teaching examples. Those of ordinary skill in the art will understand that various changes in form and details may be made to the exemplary embodiments without departing from the scope of the present invention as defined by the following claims.

What is claimed:

1. A parallel integrated circuit that accesses an external memory, comprising:
   a control processor;
   a plurality of parallel connected Vector Processing Engines (VPEs), wherein each one of the VPEs comprises a plurality of Vector Processing Units (VPUs), a plurality of VPU Control Units (VCUs), a Direct Memory Access (DMA) controller, and a VPE messaging unit (VMU) that is coupled between the plurality of VPUs, the plurality of VCUs, the DMA controller, and the control processor, wherein the VMU includes a first scheduler that is configured to schedule transfers of messages between the plurality of VPUs and the plurality of VCUs and a second scheduler that is configured to schedule transfers of DMA requests received from the plurality of VPUs and the plurality of VCUs to the DMA controller based on occupancy levels of DMA completion notification receive queues to prevent DMA completion notifications from blocking the DMA requests; and,
   an External Memory Unit (EMU) that is coupled between the external memory, the control processor, and the DMA controller within each VPE in the plurality of VPEs.

2. The integrated circuit of claim 1, wherein the VMU within each VPE comprises:
   a first memory adapted to store messages received from the plurality of VPUs and the plurality of VCUs, wherein the first scheduler is adapted to dequeue messages from the first memory, and determine an order for sending the dequeued messages to the plurality of VPUs and the plurality of VCUs; and
   a second memory associated with each receiving VPU or VCU of the plurality of VPUs and the plurality of VCUs in which incoming messages are stored.

3. The integrated circuit of claim 2, wherein the first memory is divided into a first plurality of virtual queues adapted to receive messages from corresponding VPUs;
   wherein the first scheduler is adapted to determine an order for dequeuing messages from the first plurality of virtual queues;
   wherein the second memory is divided into a second plurality of virtual queues adapted to receive messages from corresponding VPUs; and,
   wherein the integrated circuit further comprises a third scheduler adapted to determine an order for dequeuing messages from the second plurality of virtual queues.

4. The integrated circuit of claim 3, wherein each one of the VPUs and VCUs within each VPE comprises:
   a first receive queue adapted to receive messages dequeued from the first plurality of virtual queues; and,
   a second receive queue adapted to receive messages dequeued from the second plurality of virtual queues.

5. The integrated circuit of claim 3, wherein each of the plurality of VPEs comprises:
   a plurality of DMA request queues adapted to transfer DMA request messages from the second plurality of virtual queues to the DMA controller; and,
   a DMA completion notifications queue adapted to transfer the DMA completion notifications from the DMA controller to one or more of the DMA completion notification receive queues in corresponding VPUs or VCUs upon completion of a DMA operation by the DMA controller.

6. The integrated circuit of claim 5, wherein the DMA controller transfers data between instruction or data memories of the plurality of VPUs in response to a DMA request message.

7. The integrated circuit of claim 5, wherein the DMA controller broadcasts data to data or instruction memories of the plurality of VPUs in response to a DMA request message.

8. The integrated circuit of claim 5, wherein the DMA controller executes an atomic DMA transaction in response to the DMA request message.

9. The integrated circuit of claim 8, wherein the atomic DMA transaction uses load-locked semantics to transfer data from the external memory to an intermediate storage memory within each VPE.

10. The integrated circuit of claim 8, wherein the atomic DMA transaction uses store-conditional semantics to transfer data to the external memory from an intermediate storage memory within each VPE.

11. The integrated circuit of claim 1, wherein the external memory stores at least physics data;
    wherein each of the VPUs comprises a grouping of mathematical/logic execution units adapted to perform computations on physics data to produce a physics simulation.

12. The integrated circuit of claim 2, wherein each message comprises a unit of data representing one or more instructions, pointers, addresses, or operands or results of a computation.

13. A Physics Processing Unit (PPU) that accesses an external memory storing at least physics data, comprising:
    a PPU control engine (PCE) comprising a programmable PPU control unit (PCU); a plurality of parallel connected Vector Processing Engines (VPEs), wherein each one of the VPEs comprises: a plurality of Vector Processing Units (VPUs), each comprising a grouping of mathematical/logic units adapted to perform computations on physics data for a physics simulation;
    a plurality of VPU Control Units (VCUs);
    a Direct Memory Access (DMA) subsystem comprising a DMA controller; and, a VPE messaging unit (VMU) adapted to transfer messages between the plurality of VPUs, the plurality of VCUs, the DMA subsystem, and the PCE, wherein the VMU includes a first scheduler that is configured to schedule transfers of messages between the plurality of VPUs and the plurality of VCUs and a second scheduler that is configured to schedule transfers of DMA requests received from the plurality of VPUs and the plurality of VCUs to the DMA controller based on occupancy levels of DMA completion notification receive queues to prevent DMA completion notifications from blocking the DMA requests; and, an External Memory Unit (EMU) that is coupled between the external memory, the PCE, and the DMA controller within each VPE in the plurality of VPEs.

14. The PPU of claim 13, wherein the VMU within each VPE comprises:

a first memory having a read port and a write port and divided into a plurality of communication message virtual queues wherein the first scheduler is adapted to determine an order for dequeuing messages from the plurality of communication message virtual queues to schedule the transfer of messages between the plurality of VPUs and the plurality of VCUs; and a second memory having a read port and a write port and divided into a plurality of DMA request message virtual queues, wherein the second scheduler is adapted to determine an order for dequeuing messages from the plurality of DMA request message virtual queues to schedule the transfer of DMA requests received from the plurality of VPUs and the plurality of VCUs to the DMA controller.

15. The integrated circuit of claim 14, wherein each message comprises a unit of data representing one or more instructions, pointers, addresses, or operands or results of a computation.

16. The PPU of claim 15, wherein the DMA subsystem further comprises:

a plurality of DMA request queues adapted to receive DMA request messages from the DMA request message virtual queues and transfer the DMA request messages to the DMA controller; and, a DMA completion notifications queue adapted to receive the DMA completion notifications from the DMA controller and transfer the DMA completion notifications to the VCUs and VPUs.

17. The PPU of claim 16, wherein each one of the VPUs and VCUs comprises:

a communication message receive queue adapted to receive communication messages from the communication message virtual queues; and, one of the DMA completion notifications receive queues that is adapted to receive the DMA completion notifications from the DMA completion notifications queue.

* * * * *